United States Patent [19]

Abu-Isa et al.

[11] Patent Number: 4,661,546
[45] Date of Patent: Apr. 28, 1987

[54] HIGH IMPACT POLYETHYLENE TEREPHTHALATE POLYBLENDS

[75] Inventors: Ismat A. Abu-Isa, Rochester; Elio Eusebi, Troy; Craig B. Jaynes, Royal Oak, all of Mich.

[73] Assignee: General Motors Corporation, Detroit, Mich.

[21] Appl. No.: 732,405

[22] Filed: May 9, 1985

[51] Int. Cl.$^4$ .............................................. C08L 67/02
[52] U.S. Cl. ................................... 524/153; 524/539; 525/444; 525/64
[58] Field of Search ......................... 525/444; 524/153

[56] References Cited

U.S. PATENT DOCUMENTS

| | | | |
|---|---|---|---|
| 3,218,372 | 11/1965 | Okamura | 525/439 |
| 4,200,567 | 4/1980 | Goldman | 525/64 |
| 4,212,791 | 7/1980 | Avery | 525/146 |
| 4,259,458 | 3/1981 | Robeson | 525/68 |
| 4,277,391 | 7/1981 | Charles | 525/64 |
| 4,346,195 | 8/1982 | Hornbaker | 525/176 |
| 4,397,986 | 8/1983 | Hornbaker | 525/64 |
| 4,424,254 | 1/1984 | Hedrick | 428/215 |

Primary Examiner—John C. Bleutge
Assistant Examiner—Patricia A. Short
Attorney, Agent, or Firm—Randy W. Tung

[57] ABSTRACT

A high impact thermoplastic polyblend of a polyethylene terephthalate, a polyester elastomer, and an aromatic phosphite. The aromatic phosphite when added in amounts up to as much as about 5 percent by weight of the total polyblend composition causing grafting of the polyester elastomer onto the polyethylene terephthalate chains producing a thermoplastic polyblend composition having superior impact strength.

1 Claim, No Drawings ically mixed together with small fractions of other additives in a Brabender mixer. Blending of larger quantities was performed by using a plastic extruder. Both processes follow the standard procedure used in the plastics industry.

HIGH IMPACT POLYETHYLENE TEREPHTHALATE POLYBLENDS

FIELD OF THE INVENTION

The present invention generally relates to a thermoplastic blend of polyethylene terephthalate and, more particularly, is concerned with a thermoplastic blend of polyethylene terephthalate, a polyester elastomer, and an aromatic phosphite. The resulting polyblend has greatly improved impact strength.

BACKGROUND OF THE INVENTION

Polyethylene terephthalate (PET) is a low cost high performance thermoplastic material. In its crystalline state, the plastic has a very high flexural modulus and a high heat deflection temperature. Being a thermoplastic it can be economically processed by an injection molding process. The major use of polyethylene terephthalates today is in the beverage-bottle-making industry.

An injection molded polyethylene terephthalate article has excellent surface finish and low surface porosity making it suitable for painting processes. The inherent high heat deflection temperature of PET assures that a painted article can go through a paint bake cycle without thermal distortion. Based on these benefits, polyethylene terephthalate seems to be a good candidate for many automotive exterior body panel applications. However, a serious shortcoming of PET which disqualifies it from automotive applications is its very low impact strength.

One method that has been used to improve the physical properties of polyethylene terephthalate is to blend it with other thermoplastic materials. Since PET has good compatibility with many other thermoplastics, it can be easily blended with other plastic materials to give it desirable properties. For instance, impact modifiers of elastomeric base materials and high temperature plastics have been used to improve the impact property and the heat resistance property of polyethylene terephthalate. Many of these polyethylene terephthalate polyblends having improved physical properties are still inadequate to meet automotive application requirements. To be qualified for an automotive exterior body panel application, a plastic material must have high impact strength, high tensile strength, high flexural properties and easy processability.

It is therefore an object of the present invention to provide a polyblend of polyethylene terephthalate having improved impact property to meet automotive exterior panel application requirements.

It is yet another object of the present invention to provide a polyblend of polyethylene terephthalate having high impact strength and can be economically processed by the injection molding method.

It is a further object of the present invention to provide an injection moldable, high impact strength polyblend of polyethylene terephthalate capable of producing articles having readily paintable surfaces to meet automotive finishing requirements.

It is still another object of the present invention to provide a polyblend of polyethylene terephthalate having high impact strength and high temperature resistance such that a painted article can be cured in a paint bake cycle without thermal distortion.

SUMMARY OF THE INVENTION

In accordance with a preferred embodiment of this invention, a thermoplastic polyethylene terephthalate polyblend having superior impact strength can be formulated. This polyblend composition can be readily injection molded into articles having superior mechanical and aesthetic properties.

We have developed unique polyblends of PET using polyester elastomers. The uniqueness of the blend is accomplished by the incorporation of small concentrations of a third component, namely, an aromatic phosphite.

The polyethylene terephthalate used in this invention is a condensation polymer produced from dimethyl terephthalate and ethylene glycol. The polyester elastomers used are a block copolymer of tetramethylene glycol and n-butyl terephthlate (DuPont Hytrel ® 5525), a block copolymer of n-butyl terephthlate hard segment and ethylene oxide/propylene oxide soft segment (DuPont Hytrel ® 4074), and a polymer of butyl acrylate and methyl methacrylate (Rohm and Haas Acryloid ® KM-330). The percentage of the polyester elastomer used in the polyblend is in the range of 5–50 wt %. A small improvement in the impact strength is seen when a polyester elastomer is added to PET. For instance, the impact strength of 14 J/m for PET alone is increased to 26 J/m when 30 wt % Hytrel ® 4074 is added to the PET forming a polyblend.

The third important ingredient in our novel PET polyblend is an aromatic phosphite. Two types of aromatic phosphites were used in this invention, a triphenol phosphite (Borg Warner Weston ® TPP) and a pentaerythritol diphosphite (Borg Warner Ultranox ® 626). The addition of the aromatic phosphite in the PET polyblends significantly increases their impact strength even at low concentrations of less than 3 wt %. For instance, the impact strength of a PET/Hytrel ® 4074 polyblend was increased from 26 J/m to 97 J/m when 3% of triphenyl phosphite was added to the composition. Similar improvements were observed when Hytrel ® 5526 and Acryloid ® KM 330 were used in place of Hytrel ® 4074.

The three major constituents of our novel composition are mechanically mixed together with small fractions of other additives in a Brabender mixer. Blending of larger quantities was performed by using a plastic extruder. Both processes follow the standard procedure used in the plastics industry.

DETAILED DESCRIPTION OF THE INVENTION

According to this invention, a thermoplastic polyblend having superior impact properties can be formulated by the following three major components: (a) a thermoplastic polyester, preferably polyethylene terephthalate, and (b) a polyester elastomer of either a block copolymer of tetramethylene glycol and n-butyl terephthalate (Hytrel ® 5525), a block copolymer of n-butyl terephthalate and ethylene oxide/propylene oxide (Hytrel ® 4074), or a polymer of butyl acrylate and methyl methacrylate (Rohm & Haas Acryloid ® KM-330), and (c) an aromatic phosphite of either triphenol phosphite or pentaerythritol diphosphite. The proportions of each component may be varied within the range of from 45–94.5% PET, from 5 to 50% polyester elastomer, and from 0.5–5% aromatic phosphite.

In accordance with another optional embodiment of this invention, the foregoing polyblend may further include chopped fiber glass as a reinforcing agent.

These and other features, embodiments and advantages of the present invention will become apparent in the following detailed descriptions.

The polyethylene terephthalate used in the present invention is a condensation polymer produced from dimethyl terephthalate and ethylene glycol. It was obtained from Eastman Kodak Company under the tradename of Kodakpak ® PET 7352. It has a bulk density of 1.4 g/cm$^3$ and an intrinsic viscosity of 0.76 dL/g. The number average molecular weight of the PET is 24,000 and the weight average molecular weight is 48,000.

To first improve the impact strength, blends of the polymer were prepared containing only polyester elastomers. These elastomers include a block copolymer of tetramethylene glycol soft segment and n-butyl terephthalate hard segment (DuPont Hytrel ® 5525), a block polymer of n-butyl terephthalate hard segment and ethylene oxide/propylene oxide soft segment (DuPont Hytrel ® 4074), and a butyl acrylate/methyl methacrylate polymer (Rohm & Haas Acryloid ® KM-330).

To further improve processing characteristics and mechanical properties, several oligomers and additives were used. These include triphenol phosphite (Borg Warner Weston ® TPP), pentaerythritol diphosphite (Borg Warner Ultranox ®-626), sodium stearate, talc (Talc International Company Mistron ® vapor grade) and 3 mm chopped fiber glass (Owens Corning). All the materials were used as received.

Processing characteristics of polyethylene terephthalate and its polyblends with elastomers, stabilizers and processing aids were conducted using a Plasticorder ® viscometer made by the Brabender Company. Small quantities of polyblends are also prepared by using this machine. The torque required for mixing the blends in a temperature controlled bowl using twin blades designed for mixing of plastics was recorded with time. The temperature was kept at 271° C. The blades were rotated at 75 rpm. Because of the high sensitivity of PET to moisture, the resin was dried overnight in a vacuum oven at 150° C. prior to use. Other resins and additives capable of absorbing moisture were also dried under the same conditions.

Blending of larger quantities (more than 1 kg) of the PET polyblends was conducted by using a Plasticorder ® extruder barrel. The barrel of the extruder has an L/D ratio of 25:1. The compression ratio of the extruder screw was 4:1. All ingredients of the blends were first dry blended in a beaker. They were then gradually fed into the extruder barrel. The screw speed of the extruder was maintained at 7 rpm. Four temperature zones in the extruder barrel were adjusted and controlled for each extrusion. The rear zone of the extruder was controlled at a constant temperature whose value was selected for easy feeding of the blends into the extruder screw. The temperature range used for the various blends was between 232° C.–248° C. The middle and the front zones of the extruder were controlled at 271° C. and the nozzle temperature was maintained at 230° C. for all the polyblends. The extrudates were air cooled, chopped and stored in a desiccator until they were molded. If the sample were stored in the desiccator over 24 hours, re-drying in the vacuum oven at 150° C. for a minimum of 4 hours was carried out prior to molding.

The investigation of processing characteristics of the PET polyblends was conducted using the Brabender Plasticorder ®. Torque measurements using this instrument were conducted at constant temperature of 271° C. and constant shear rate at a blade speed of 75 rpm. Generally between 70 grams and 80 grams of PET pellets or PET dry blends with the other ingredients were placed in the Brabender chamber which had already been maintained at 271° C. and 75 rpm blade speed. The material was compacted into the chamber using a hammar arm which consisted of a cover in the mixing chamber inlet attached to a long arm which maintained a constant weight on the cover during mixing. Compaction was carried out for a minute or two. The torque needed for the melt mixing of ingredients was recorded versus time on a chart recorder.

In the case of a pure PET compound, a sharp drop in torque is observed in the first six minutes of mixing. This period includes the time spent in compacting the sample into the mixing chamber and the time needed for the sample to reach the chamber temperature. After that, a slow decrease in torque is observed with time and it is attributable to breakdown in the molecular weight of PET as a result of the continued mixing at high melt temperature of 271° C. Lower molecular weight gives rise to lower melt viscosity and, hence, lower torque. However, the addition of triphenyl phosphite (Weston ® TPP) to the PET reverses this trend of torque decrease. After the initial equilibration period a marked increase in torque occurs after 4 minutes of mixing followed by a more gradual increase in torque with time. Hence, the presence of TPP with PET during mixing encourages molecular weight buildup.

Not all organic phosphites lead to torque buildup. For instance, the addition of an aliphatic phosphite, distearylpentaerythritol diphosphite (Borg Warner Weston ® 618) leads to fast degradation in torque to very low values in a relatively short period of time. The torque value of PET containing this phosphite is only 150 g-m after 10 minutes of mixing compared to 800 g-m for the PET containing TPP. On the other hand, the addition of another aromatic phosphite, bis(2,4-di-tert-butylphenyl) pentaerythritol diphosphite (Ultranox ® 626) gives rise to torque versus time curve similar to that of TPP. The torque values are similar in the case of these two aromatic phosphites all through the range of mixing time. The only difference is that the sharp increase in torque in the case of the Ultranox ® 626 is observed after 6 minutes of mixing. The torque reaches a maximum value at or about 11 minutes, then starts decreasing up to a mixing time of 16 minutes. The torque then increases gradually with mixing time. So like the TPP, these aromatic phosphites encourage viscosity and molecular weight buildup during melt processing.

The mixing characteristics of blends of PET with other polyesters were also investigated. The polyesters are block copolymers consisting of n-butyl terephthalate hard segments and either ethylene oxide/propylene oxide (Hytrel ® 4077) or tetramethylene glycol (Hytrel ® 5526) soft segments. The torque versus mixing time curve at 271° C. for Hytrel ® 5526 looks like that of PET, except that the torque values are very much reduced at all mixing times. A blend of 80/20 weight PET/copolyester has a torque-time curve similar in shape to those of the pure components. As expected, the torque values are in between those of the pure components.

The addition of TPP to the PET/copolyester blends gives rise to a new phenomenon. The addition of 2 phr TPP to an 80/20 PET/Hytrel ® 5526 blend results in much higher torque values. For example, after 4 minutes of mixing the torque value of the blend containing the TPP is 1100 g-m as compared to 600 g-m for the blend without the TPP. Where a decrease in torque with time is observed in the blend without TPP, the torque increases markedly for the blend containing TPP, reaching maximum value of 1470 g-m after 9 minutes of mixing. A sharp decrease in torque follows this maximum. However, even after 25 minutes of mixing, the torque of blend containing the TPP is 870 g-m which is much higher in value than the 400 g-m torque for the blend without the TPP. The addition of 5 phr TPP to the blend gives similar results as the addition of 2 phr except that the maximum in torque is reached at a lower mixing time of 6 minutes and the viscosity is reduced to a value of only 290 g-m after 25 minutes of mixing. Therefore, it is beneficial to add 2 phr rather than 5 phr TPP to the blend.

The addition of TPP to Hytrel ® 4074 alone increases the torque values and gives rise to a maximum in the torque versus time curve at about 8 minutes of mixing. However, this increase in torque is much lower than the increase observed when TPP is added to a blend of PET and copolyester. The maximum torque in the case of the copolyester alone is 790 g-m, whereas the maximum torque for the blend of PET/copolyester is 1230 g-m.

The exact chemical reaction which occurred during the mixing of the polyblends is not known. However, we believe a transesterification reaction has occurred with the aromatic phosphite acting as a catalyst leading to high molecular weight copolyesters in the blend. The very large increase in torque in the case of PET/copolyester blends in the presence of TPP is due to transesterification reactions and the resulting grafting of copolyester onto the PET.

The extruded and chopped samples of PET blends are injection molded into sample bars by using two machines. A New Britain 75 TP injection molder was used to prepare plaques of 76 mm×152×3.2 mm in dimensions. The L/D ratio of the screw in this machine is 20:1. The temperatures of the front zone of the injection barrel and of the injection nozzle were maintained at 271° C., while the temperature of the rear zone barrel was kept at 250° C. for all materials molded. Adjustments in mold fill time, shot time, mold cycle time and injection pressure were made to obtain the best molded part appearance for each of the PET blends. In all cases the mold temperature was maintained at 150° C. using electric heaters.

The impact strength of the PET blends was measured by two methods. In the first method, an Izod pendulum equipment was used per ASTM D-256 test method to measure the notched and in some cases the unnotched impact strength of the PET blends at room temperature. The second method employed an instrumented constant velocity dart apparatus manufactured by the Rheometrics Company. The sample used in this method was 76 mm×152 mm×3.2 mm plaque. It was positioned in front of the dart and clamped tightly in a ring fixture located inside an environmental chamber. Dart speeds of 6.7, 0.67, and 0.067 m/s were used for characterizing the impact strength of the PET blends. The advantage of this method over the Izod method is that it is not a single value test method but instead it describes the failure process. For example, using this method the entire load versus deflection and energy versus deflection curves are obtained for each sample. From these curves, modulus values as well as energy to yield, energy to failure, and strength to yield and failure values are obtained.

The present invention is further illustrated in the following examples, which are not to be construed as limiting. All parts are measured by weight unless otherwise specified.

EXAMPLES 1, 2 AND 3

The blend composition and the impact strengths of examples 1, 2 and 3 are illustrated in Table I. Example 1 was PET only molded from pellets as received producing an impact strength of 14 joules/meter (J/m). The addition of 30% copolyester elastomer of Hytrel ® 4074 (Example 2) increases its impact strength from 14 J/m to 26 J/m, a two-fold increase. A drastic improvement in the impact strength was seen in Example 3 when 3% of triphenyl phosphite (Borg Warner Weston ® TPP) was added to the PET/copolyester blend. The impact strength of Example 3 increased almost by 4 times that of Example 2 which contained no aromatic phosphite. We believe this is a result of the transesterification reaction between PET and the copolyester in which the grafting of the copolyester onto the PET chains greatly increases the molecular weight of the polyblend under the catalytic reaction of the aromatic phosphite. The increased molecular weight in turn leads to a superior impact strength in the polyblend containing the 3% aromatic phosphite.

TABLE I

|  | Example | | |
|---|---|---|---|
|  | I | II | III |
| Blend Composition, wt % | | | |
| PET | 100 | 70 | 68 |
| Hytrel ® 4074 | 0 | 30 | 29 |
| Weston ® TPP | 0 | 0 | 3 |
| Impact Strength | | | |
| ⅛" Notched Izod, J/m | 14 | 26 | 97 |

EXAMPLES 4 AND 5

The blend composition and the impact strength of Examples 4 and 5 are shown in Table 2. The impact strength data was obtained by the constant velocity dart method at a velocity of 0.067 m/s. Example 4 contains approximately 20% copolyester elastomer of Hytrel ® 5526 and small fractions of antioxidants and fillers. The impact strength of Example 4 was actually lower than that of the impact strength of pure PET compound at 0.067 meter/sec dart speed. However, the impact strength of the polyblend PET/Hytrel ® 5526 was increased from 0.34J to 1.78J when 1.9% aromatic phosphite (Borg Warner Weston ® TPP) was added as shown by Example 5.

TABLE II

|  | Example | |
|---|---|---|
|  | IV | V |
| Blend Composition, wt % | | |
| PET | 77.6 | 76.1 |
| Hytrel ® 5526 | 19.4 | 19.0 |
| Weston ® TPP | 0 | 1.9 |
| Irganox ® 1010[1] | 0.08 | 0.08 |
| Mistron ® Vapor Talc[2] | 2.9 | 2.9 |
| Dilauryl thiodipropionate[3] | 0.02 | 0.02 |

TABLE II-continued

|  | Example | |
|---|---|---|
|  | IV | V |
| Impact Strength | | |
| Constant Velocity, J | 0.34 | 1.78 |
| at 0.067 m/s | | |

[1] antioxidant, supplied by Giba-Geigy
[2] filler, supplied by Talc International Company
[3] antioxidant, supplied by Giba-Geigy

EXAMPLES 6 AND 7

The blend composition and the impact strengths of Examples 6 and 7 are shown in Table III. Example 6 contains 25% butylacrylate/methylmethacrylate polymer (Rohm & Haas Acryloid ® KM-330) and small fractions of antioxidants and filler. Example 6 shows high impact strength values of 11.8J and 7.12J at dart speeds of 0.067 m/s and 0.67 m/s, respectively. Lower impact strength of 2.31J was obtained for the blend at dart speed of 6.7 m/s. Appreciably higher impact strength values were obtained when 1.9% TPP was added to the blend (Example 7). A two-fold to three-fold increase in the impact strength was observed at lower dart speed of 0.067 m/s and 0.67 m/s. At high dart speed of 6.7 m/s, the impact strength of Example 7 was only moderately increased.

TABLE III

|  | Example | |
|---|---|---|
|  | VI | VII |
| Blend Composition, wt % | | |
| PET | 74.9 | 71.4 |
| Acryloid ® KM 330 | 25.0 | 23.8 |
| Weston ® TPP | 0 | 1.9 |
| Irganox ® 1010[1] | 0.08 | 0.08 |
| Mistron ® Vapor Talc[2] | 0 | 2.8 |
| Dilaurylthiodipropionate[3] | 0.02 | 0.02 |
| Impact Strength | | |
| Constant Velocity Dart, J | | |
| at 0.067 m/s | 11.8 | 21.7 |
| at 0.67 m/s | 7.12 | 21.4 |
| at 6.7 m/s | 2.31 | 2.59 |

[1] antioxidant, supplied by Giba-Geigy
[2] filler, supplied by Talc International Company
[3] antioxidant, supplied by Giba-Geigy The addition of more than one polyester elastomer to the PET/aromatic phosphite polyblend was not experimented. However, we believe the principle of molecular weight build-up in the polyblend should work equally well when more than one type of polyester elastomer is added to such polyblend. For instance, a blend of Hytrel ® 4074/Hytrel ® 5526/PET/aromatic phosphite where the total elastomer content is in the range of 5-50 wt % should have equally superior impact strength.

The addition of 1 inch chopped glass fibers to the polyblend generally increases the impact strength. However, this improvement in impact strength is obtained at the cost of sacrificing some aesthetic properties.

The embodiments of the invention in which an exclusive property of privilege is claimed are defined as follows:

1. A thermoplastic polyblend molding composition comprising an intimate admixture of:
   (a) 80 to 60% by weight of total polyblend composition of a polyethylene terephthalate produced by the condensation polymerization of dimethyl terephthalate and ethylene glycol,
   (b) 19 to 37% by weight of total polyblend composition of at least one polyester elastomer selected from the group consisting of a block copolymer of tetramethylene glycol and n-butyl terephthalate, and a block copolymer of n-butyl terephthalate and ethylene oxide/propylene oxide,
   (c) 1 to 3% by weight of total polyblend composition of triphenyl phosphite,
   the total of (a), (b), and (c) being equal to 100%, whereby said polyblend molding composition having an impact strength of at least about 60 Joules/meter as measured by the ASTM procedure D-256.

* * * * *